United States Patent
Clerckx et al.

(10) Patent No.: US 8,867,646 B2
(45) Date of Patent: Oct. 21, 2014

(54) MULTIPLE-INPUT MULTIPLE-OUTPUT COMMUNICATION SYSTEM CONTROL METHOD AND APPARATUS

(75) Inventors: Bruno Clerckx, Yongin-si (KR); Joon-Il Choi, Seoul (KR); Sung Jin Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1862 days.

(21) Appl. No.: 12/173,865

(22) Filed: Jul. 16, 2008

(65) Prior Publication Data

US 2009/0238292 A1    Sep. 24, 2009

(30) Foreign Application Priority Data

Mar. 24, 2008  (KR) .................. 10-2008-0027041

(51) Int. Cl.
- *H04B 7/02* (2006.01)
- *H04L 1/02* (2006.01)
- *H04W 28/16* (2009.01)
- *H04B 7/04* (2006.01)
- *H04W 52/26* (2009.01)
- *H04W 72/12* (2009.01)

(52) U.S. Cl.
CPC ............ *H04W 28/16* (2013.01); *H04W 52/267* (2013.01); *H04W 72/121* (2013.01); *H04B 7/043* (2013.01); *H04B 7/0452* (2013.01)
USPC .......................................... 375/267; 455/132

(58) Field of Classification Search
USPC .......................................... 375/267; 455/132
See application file for complete search history.

(56) References Cited

U.S. PATENT DOCUMENTS

| | | | |
|---|---|---|---|
| 2003/0193907 A1* | 10/2003 | Rezaiifar et al. | 370/329 |
| 2004/0121791 A1* | 6/2004 | May et al. | 455/519 |
| 2005/0135320 A1* | 6/2005 | Tiedemann et al. | 370/338 |
| 2007/0155431 A1* | 7/2007 | Munzner et al. | 455/560 |

FOREIGN PATENT DOCUMENTS

EP    1 819 088 A2    8/2007

OTHER PUBLICATIONS

Korean Office Action issued Feb. 14, 2014 in counterpart Korean Application No. 10-2008-0027041. (4 pages, in Korean).

* cited by examiner

*Primary Examiner* — Tanmay Shah
(74) *Attorney, Agent, or Firm* — NSIP Law

(57) ABSTRACT

A communication system control method, a communication system control apparatus and an apparatus for use in a communication system are provided. The communication system control apparatus includes an information collection unit to collect user set information about candidate user sets grouped by a plurality of base stations, and a scheduler to select target user sets corresponding to the plurality of base stations from among the candidate user sets based on an achievable sum data transmission rate of the plurality of base stations, and perform scheduling with respect to users included in the target user sets, the achievable sum data transmission rate being calculated based on the user set information.

20 Claims, 5 Drawing Sheets

MULTIPLE-INPUT MULTIPLE-OUTPUT COMMUNICATION SYSTEM CONTROL METHOD AND APPARATUS

CROSS-REFERENCE TO RELATED APPLICATION

This application claims the benefit under 35 U.S.C. §119 (a) of a Korean Patent Application No. 10-2008-0027041, filed on Mar. 24, 2008, in the Korean Intellectual Property Office, the entire disclosure of which is incorporated herein by reference.

TECHNICAL FIELD

The following description relates to a multiple-input multiple-output (MIMO) communication system, and more particularly, to a method and apparatus for controlling a multi-cell MIMO communication system.

BACKGROUND

There is an active research in technologies to provide various types of multimedia services including voice services and to support the high quality and high speed of data transmission in a wireless communication environment. Technologies associated with a multiple-input multiple-output (MIMO) communication system using multiple channels are in rapid development.

In a MIMO communication system, a base station may support a plurality of users according to a Spatial Division Multiple Access (SDMA) scheme. The SDMA scheme may transmit at least one data stream to multiple-users through a plurality of antennas. The SDMA scheme uses wireless resources efficiently to increase a data transmission rate of the MIMO communication system.

A MIMO communication system may include a plurality of base stations, and each of the plurality of base stations may support a plurality of users according to an SDMA scheme.

However, interference may occur between multiple users where a plurality of users exists. Also, inter-cell interference may occur where a plurality of base stations exists. The above-described interference may decrease a sum data transmission rate of a MIMO communication system.

Accordingly, there is a need for improving a sum data transmission rate of a MIMO communication system, taking into consideration of inter-cell interference, interference between a plurality of users, and the like.

SUMMARY

In one general aspect, there is provided a communication system control apparatus which performs scheduling with respect to users to increase a sum data transmission rate, taking into consideration of inter-cell interference.

In another general aspect, a base station is provided to generate a transmission signal corresponding to scheduled users to maximize a sum of data transmission rates of a multiple-input multiple-output (MIMO) communication system.

In still another general aspect, a communication system control apparatus includes an information collection unit to collect user set information about candidate user sets grouped by a plurality of base stations, and a scheduler to select target user sets corresponding to the plurality of base stations from among the candidate user sets based on an achievable sum data transmission rate of the plurality of base stations, and perform scheduling with respect to users included in the target user sets, the achievable sum data transmission rate being calculated based on the user set information.

The scheduler may select the target user sets taking into consideration of inter-cell interference.

The scheduler may select the target user sets to maximize the achievable sum data transmission rate.

The scheduler may control power of beams corresponding to the users included in the target user sets based on the achievable sum data transmission rate.

The scheduler may control the power of the beams corresponding to the users included in the target user sets to any one of turn-on mode and turn-off mode.

The user set information may include at least one of channel information, beamforming weight vector information, and interference information about users included in the candidate user sets.

The candidate user sets may be grouped by the plurality of base stations based on a data transmission rate achievable by each of the plurality of base stations.

The communication system control apparatus may further comprise a result providing unit to transmit information about a scheduling result of the scheduler to the plurality of base stations.

The plurality of base stations may generate a transmission signal corresponding to the users included in the target user sets based on the scheduling information.

Each of the plurality of base stations may comprise a plurality of antennas.

In yet another general aspect, a base station includes a grouping unit to group a plurality of users into a plurality of candidate user sets based on an achievable data transmission rate of the base station, an information providing unit to provide user set information about the plurality of candidate user sets to a communication system control apparatus, and a transmission signal generation unit to generate a transmission signal corresponding to at least one user included in a target user set based on a scheduling result of the communication system control apparatus, the target user set being selected by the communication system control apparatus from the candidate user sets.

The plurality of users may be included in coverage of the base station.

The base station may control power of beams corresponding to the at least one user included in the target user set to any one of turn-on mode and turn-off mode, and the transmission signal generation unit may generate the transmission signal corresponding to the at least one user included in the target user set based on the controlled power.

The target user set may be selected by the communication system control apparatus from the candidate user sets based on a sum data transmission rate achievable by the base station and at least one base station neighboring to the base station, and the scheduling result may be a result of performing scheduling with respect to the at least one user included in the target user set by the communication system control apparatus.

In yet still another general aspect, a communication system control method includes collecting user set information about candidate user sets grouped by a plurality of base stations, selecting target user sets corresponding to the plurality of base stations from among the candidate user sets based on an achievable sum data transmission rate of the plurality of base stations, the achievable sum data transmission rate being calculated based on the user set information, performing scheduling with respect to users included in the target user sets, and providing information about a result of the scheduling to the plurality of base stations.

The selecting of the target user sets may comprise selecting the target user sets from the candidate user sets, taking into consideration of inter-cell interference.

The method may further comprise controlling power of beams corresponding to the users included in the target user sets based on the achievable sum data transmission rate.

The controlling of the power may comprise controlling the power of the beams corresponding to the users included in the target user sets to any one of turn-on mode and turn-off mode.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1:
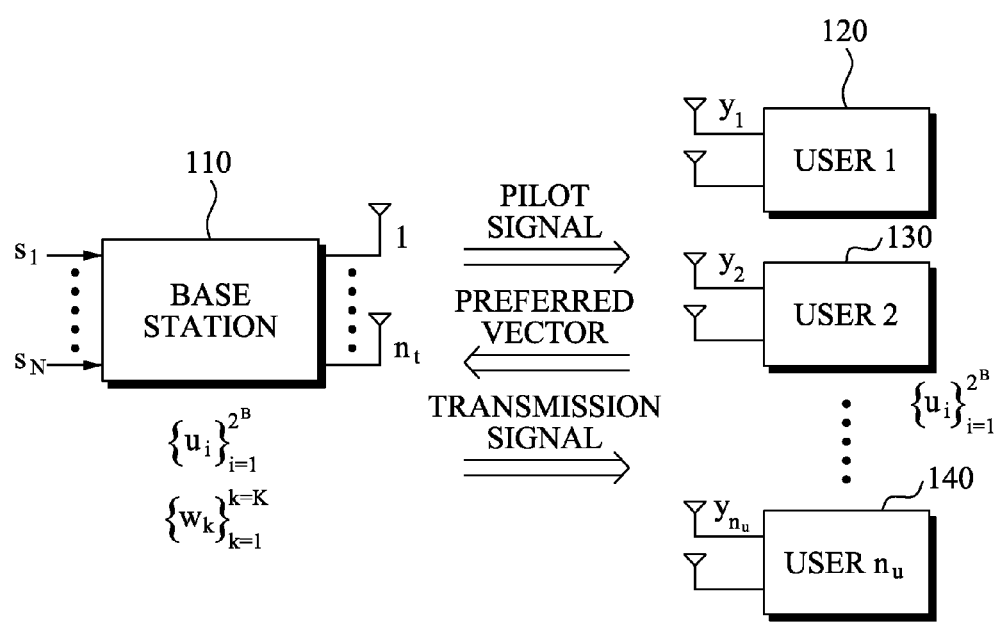
FIG. 1 is a diagram illustrating a multi-user multiple-input multiple-output (MIMO) communication system according to an exemplary embodiment.

FIG. 1 illustrates an exemplary multi-user Multiple-Input Multiple-Output (MIMO) communication system.

As illustrated in FIG. 1, the multi-user MIMO communication system includes a single base station 110 and a plurality of users 120, 130, and 140. A plurality of antennas may be installed in the base station 110. A single or a plurality of antennas may be installed in each of the plurality of users 120, 130, and 140. Also, a channel $H_k$ may be formed between the base station 110 and each of the plurality of users 120, 130, and 140. The base station 110 and each of the plurality of users 120, 130, and 140 transmit/receive a signal through the formed channel $H_k$.

The base station 110 may transmit a single or at least two data streams to the plurality of users 120, 130, and 140. In this case, the base station 110 generates a transmission signal by beamforming the data streams according to a Spatial Division Multiple Access (SDMA) scheme. A precoding matrix included in a codebook is used to generate the transmission signal.

The base station 110 transmits pilot signals to the plurality of users 120, 130, and 140 through a downlink channel. The pilot signals are well-known to the base station 110 and plurality of users 120, 130, and 140.

Each of the plurality of users 120, 130, and 140 receives the pilot signals and estimates the channel $H_k$ formed between the base station 110 and the plurality of users 120, 130, and 140. Here, k is an index of a user. Each of the plurality of users 120, 130, and 140 selects any one of vectors $\{u_i\}_{i=1}^{2^B}$, included in a previously stored codebook, as a preferred vector $u_k$ based on the estimated channel $H_k$. Here, $u_i$ denotes an $i_{th}$ vector, and B denotes a number of feedback bits. Where the number of feedback bits is B, $2^B$ vectors quantizing space are stored in the codebook.

Also, each of the plurality of users 120, 130, and 140 may select any one of the $2^B$ vectors $\{u_i\}_{i=1}^{2^B}$ as the preferred vector $u_k$ based on various standards.

For example, each of the plurality of users 120, 130, and 140 may select any one of the $2^B$ vectors $\{u_i\}_{i=1}^{2^B}$ as the preferred vector $u_k$ based on a Signal to Interference and Noise Ratio (SINR) or achievable data transmission rate. Each of the users 120, 130, and 140 may also determine its own preferred transmission rank, which indicates the number of data streams.

Each of the plurality of users 120, 130, and 140 feedbacks information associated with the preferred vector $u_k$ to the base station 110. The information associated with the preferred vector $u_k$ may be referred to as channel direction information (CDI).

The base station 110 receives information associated with the preferred vector $u_k$ of each of the plurality of users 120, 130, and 140, and determines a preceding matrix $\{W_k\}_{k=1}^{k=K}$. Here, K denotes a number of users. Also, the base station 110 may select a portion of or all users 120, 130, and 140 using a variety of user selection algorithms such as a Semi-orthogonal User Selection (SUS), Greedy User Selection (GUS), and the like.

In this case, a codebook identical to the codebook stored in the plurality of users 120, 130, and 140 may be previously stored in the base station 110.

The base station 110 determines the precoding matrix $\{W_k\}_{k=1}^{k=K}$ from the previously stored codebook using the information associated with the preferred vector $u_k$ and received from the plurality of users 120, 130, and 140. In this case, the base station 110 may determine the precoding matrix $\{W_k\}_{k=1}^{k=K}$ to enable a sum data transmission rate to be maximized.

Also, the base station 110 precodes data streams $S_1$ and $S_k$ using the determined precoding matrix $\{W_k\}_{k=1}^{k=K}$, and thereby generates a transmission signal. An operation where the base station 110 generates the transmission signal is referred to as 'beamforming'.

Figure 2:
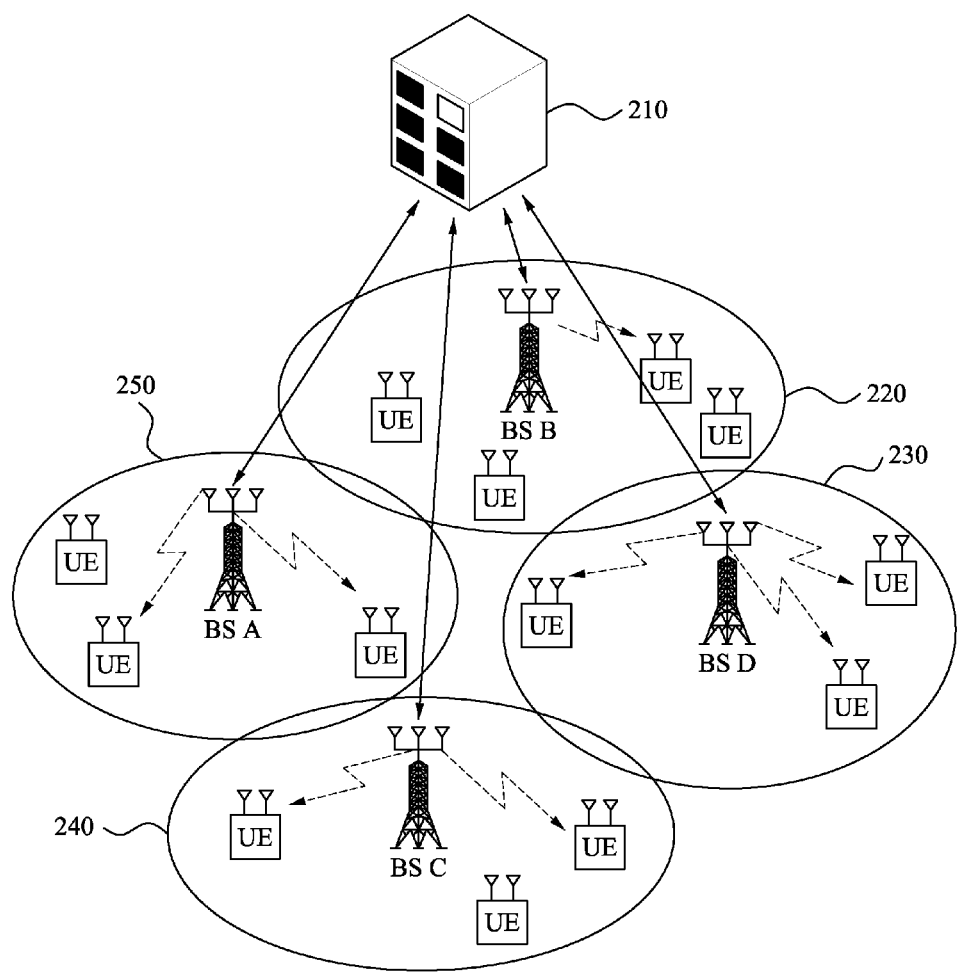
FIG. 2 is a diagram illustrating a multi-cell multi-user MIMO communication system according to an exemplary embodiment.

FIG. 2 illustrates an exemplary multi-cell multi-user MIMO communication system.

As illustrated in FIG. 2, the multi-cell multi-user MIMO communication system includes a communication system control apparatus 210 and a plurality of cells 220, 230, 240, and 250. Each of the plurality of cells 220, 230, 240, and 250 may include a single base station and a plurality of users.

A signal transmitted from each of a plurality of base stations BS A, BS B, BS C, and BS D is received by the plurality of users. Interference among the plurality of users may exist.

For example, a signal transmitted from BS A is received by users included in a cell of BS A. Here, the signal transmitted from BS A may include a signal desired by a single user as well as a signal desired by the other users. Accordingly, the signal received by the single user may include interference, and such interference may decrease a data transmission rate of the BS A.

In addition, inter-cell interference may exist due to the plurality of base stations BS A, BS B, BS C, and BS D. For example, the signal transmitted from BS A may be received by users included in the cell 230, 240, or 250. The inter-cell interference may also decrease a data transmission rate that each of the plurality of base stations BS A, BS B, BS C, and BS D may achieve.

Accordingly, taking into consideration of the interference among the users and inter-cell interference, users that desire to receive the transmission signal are selected so to maximize a sum data transmission rate. The power of the transmission signal is also appropriately assigned.

For convenience of description, it is assumed that a number of antennas installed in base stations is $N_t$, and a single antenna is installed in users. Also, it is assumed that N base stations exist, and an index of cells is n. Here, n is a natural number from 1 to N. In this case, an $n_{th}$ cell includes $K_n$ users.

A receiving signal $y_i^n$ of a user i included in the $n_{th}$ cell may be represented as, $$y_i^n = \sum_{m=1}^{N} (h_i^{n,m})^T x^m + z_i^n. \quad \text{[Equation 1]}$$

Here, $h_i^{n,m} \in C^{n_t \times 1}$, $h_i^{n,m}$ denotes a channel vector of a channel formed between a base station m and the user i included in the $n_{th}$ cell. $x^m \in C^{n_t \times 1}$, $x^m$ denotes a transmission signal transmitted from the base station m, $z_i^n$ and denotes white Gaussian noise.

Each of the N base stations may schedule a portion of the plurality of users as a user set Sn using various user selection algorithms. The N base stations may schedule the plurality of users as a plurality of user sets Sn. Here, the user set Sn includes users that desire to receive the transmission signal. The user set Sn scheduled by a base station n of the $n_{th}$ cell may be represented as, $$S_n = \{i \in [1, \ldots, K_n] | [S_n]_j \neq [S_n]_k \forall j \neq k\}. \quad \text{[Equation 2]}$$

Here, the user set Sn may include a maximum of $n_t$ elements.

A user set S of an whole network scheduled by each of the N base stations may be represented as, $$S = [S_1, \ldots, S_n, \ldots, S_N]. \quad \text{[Equation 3]}$$

It is assumed that a beamforming vector for the user i included in the $n^{th}$ cell is $w_i^n$, and a transmission symbol is $s_i^n$. When $Sn=n_t$, Equation 4 may be given as, $$H^{n,m} = [h_1^{n,m} h_2^{n,m} \ldots h_{K_n}^{n,m}]^T$$

$$W^m = [w_1^m w_2^m \ldots w_{K_n}^m]$$

$$s^m = [s_1^m s_2^m \ldots s_{K_n}^m]. \quad \text{[Equation 4]}$$

Here, $H^{n,m}$ denotes a channel matrix of a channel formed between the base station m and users included in the $n_{th}$ cell, $W^m$ denotes a precoding matrix used by the base station m, and $s^m$ denotes a vector for a user included in an $m_{th}$ cell. The channel matrix and precoding matrix have a size of $n_t \times n_t$, and the vector has a size of $n_t \times 1$.

By referring to Equation 1 through Equation 4, a system output equation based on the user set Sn may be represented as, $$y^n(S) = \sum_{m=1}^{N} H^{n,m}(S_n) W^m(S_m) s^m(S_m) + z^n(S_n). \quad \text{[Equation 5]}$$

Here, $W^m(S_m)$ may be represented as, $$W^m(S_m) = H^{n,m}(S_m)^\dagger = H^{m,m}(S_m)^* (H^{m,m}(S_m) H^{m,m}(S_m)^*)^{-1}. \quad \text{[Equation 6]}$$

By referring to Equation 1 through Equation 6, a receiving signal of the user i included in the user set Sn may be represented as, $$y_i^n = \sum_{m=1}^{N} \sum_{j \in S_m} (h_i^{n,m})^T w_j^m s_j^m + z_i^n \quad \text{[Equation 7]}$$

Here, where power of transmission signal used by the base station n is $p_n$, $$\sum_{i \in S_n} [p_n]_i \leq P_{max}.$$

That is, the power of the transmission signal used by the base station n is less than $P_{max}$. Total transmission power p used by of the N base stations may be represented as $p = [p_1, \ldots, p_n, \ldots, p_N]$.

An SINR of the user i included in the $n_{th}$ cell may be represented as, $$\Gamma_i^n(p, S) = \frac{|(h_i^{n,n})^T w_j^n|^2 p_i^n}{\sigma^2 + \underbrace{\sum_{j \neq i \in S_n} |(h_i^{n,n})^T w_j^n|^2 p_j^n}_{\text{Multi-user Interference}} + \underbrace{\sum_{m \neq n}^{N} \sum_{k \in S_m} |(h_i^{n,m})^T w_k^m|^2 p_k^m}_{\text{Inter-cell Interference}}}, \quad \text{[Equation 8]}$$

where $p_i^n$ denotes power of the transmission signal for the user i included in the $n_{th}$ cell.

By referring to Equation 8, a denominator includes noise, interference among users, and inter-cell interference. Accordingly, a sum of the interference among users and inter-cell interference should decrease in order to increase the SINR of the user i included in the $n_{th}$ cell.

A Shannon's capacity Cn or data transmission rate of the base station n may be represented as, $$C_n(p, S) = \sum_{i \in S_n} \log(1 + \Gamma_i^n(p, S)). \quad \text{[Equation 9]}$$

Accordingly, a sum data transmission rate that the N base stations may achieve may be represented as, $$C(p, S) = \sum_{n=1}^{N} \sum_{i \in S_n} \log(1 + \Gamma_i^n(p, S)). \quad \text{[Equation 10]}$$

Thus, the sum data transmission rate C(p, S) of Equation 10 may be maximized by appropriately scheduling the total transmission power p and user set S. That is, the total transmission power p and user set S are determined to maximize the sum data transmission rate C(p, S), taking into consideration of the inter-cell interference and interference among users. To maximize the sum data transmission rate C(p, S), each of the user sets Sn is to be appropriately determined based on the inter-cell interference and interference among users. Similarly, the total transmission power p is to be appropriately determined to maximize the sum data transmission rate C(p, S) with respect to users included in each of the user sets Sn.

Figure 3:
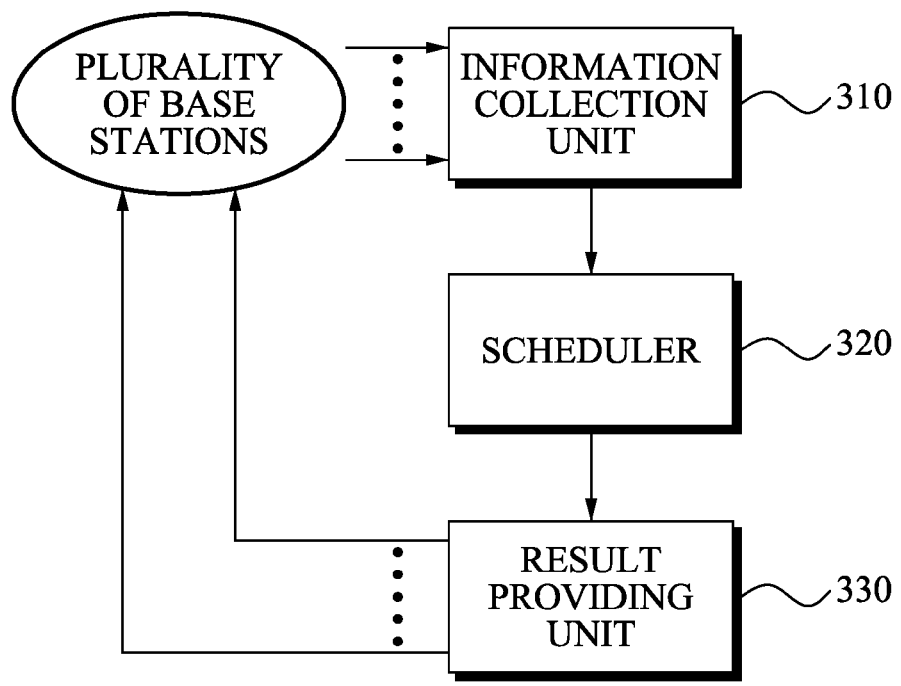
FIG. 3 is a block diagram illustrating a communication system control apparatus according to an exemplary embodiment.

FIG. 3 illustrates an exemplary communication system control apparatus.

As illustrated in FIG. 3, the communication system control apparatus includes an information collection unit 310, scheduler 320, and result providing unit 330.

A base station n may group users, included in an $n_{th}$ cell, into a plurality of user sets $S_n^\perp$. For example, channels formed between the base station n and each of the users included in the user sets $S_n^\perp$ grouped by the base station n may be orthogonal to each other. Any one of the user sets $S_n^\perp$ grouped by the base station n may be represented as, $$S_n^\perp = \{i,j\epsilon[1,\ldots,K_n] | h_i^{n,n} \perp h_j^{n,n} \forall i \neq j\} \quad \text{[Equation 11]}$$

Here, $S_n^\perp$ may include $n_t$ users.

In this case, the base station n may perform local optimization operation. That is, the base station n may assume that the inter-cell interference does not exist and only interference among the users exist, and perform the local optimization operation.

Therefore, the base station n may determine a single or at least two candidate user sets from among the plurality of user sets $S_n^\perp$ based on a data transmission rate that the base station n may achieve. Specifically, the base station n may find an Ln number of user sets $S_n^\perp$ to maximize the data transmission rate that the base station n may achieve through Equation 12.

$$\arg\max_{S_n \in Q_n} \sum_{i \in S_n} \log\left(1 + \frac{\frac{P_{max}}{n_t}|(h_i^{n,n})^T w_i^n|^2}{\sigma^2 + \sum_{j \neq i \in S_n} \frac{P_{max}}{n_t}|(h_i^{n,n})^T w_j^n|^2}\right) \quad \text{[Equation 12]}$$

where $S_n^\perp \in Q_n^\perp$, $Q_n^\perp$ denotes a set of the Ln user sets $S_n^\perp$ to maximize the data transmission rate that the base station n may achieve.

Here, the Ln user sets $S_n^\perp$, which are elements of the set $Q_n^\perp$ may be referred to as candidate user sets. That is, the base station n may find Ln candidate user sets to maximize the data transmission rate that the base station n may achieve.

In this case, the information collection unit 310 of the communication system control apparatus collects user set information about the candidate user sets grouped by a plurality of base stations. The user set information may include channel information, beamforming weight vector information, and/or interference information about users included in each of the candidate user sets. For example, by referring to Equation 12, the channel information may be associated with $h_i^{n,n}$, the beamforming weight vector information may be associated with $w_i^n$ and $w_j^n$, and the interference information may be associated with $$\sum_{j \neq i \in S_n} \frac{P_{max}}{n_t}|(h_i^{n,n})^T w_j^n|^2.$$

The scheduler 320 calculates a sum of data transmission rates that the plurality of base stations may achieve, based on the collected user set information corresponding to each of the plurality of base stations. Specifically, each of the plurality of base stations may calculate a sum data transmission rate with respect to each of the Ln candidate user sets through Equation 10. The Ln candidate user sets are elements of the set $Q_n^\perp$.

In this case, the scheduler 320 may select target user sets from among the candidate user sets to maximize the sum data transmission rate, and perform scheduling with respect to users included in the selected target user sets. The target user sets are selected from the Ln candidate user sets. For example, a candidate user set having a greatest sum data transmission rate may be selected as the target user set. That is, where N base stations exist, each of the N base stations may select the target user set.

Also, the scheduler 320 may control power of beams corresponding to users included in the selected target user sets. Specifically, the scheduler 320 may turn on or turn off the power of the beams to maximize the sum data transmission rate, taking into consideration of inter-cell interference and interference among users. For example, the scheduler 320 may select the target user sets, and turn on or turn off the power of the beams corresponding to the users included in the target user sets through Equation 13.

$$\arg\max_{\substack{P_i^n \in [0,1] \forall i,n \\ S_n^\perp \in Q_n^\perp \forall n}} C(p, S). \quad \text{[Equation 13]}$$

By referring to Equation 13, it may be ascertained that power $P_i^n$ of beam corresponding to a user i included in the target user sets is turned on or turned off. Also, it may be ascertained that the scheduler 320 may select any one of a plurality of user sets included in the set $Q_n^\perp$ as the target user set in order to maximize the sum data transmission rate.

The result providing unit 330 transmits scheduling information of the scheduler 320 to the plurality of base stations. The scheduling information, that is, information about the scheduling result, may include information about the target user sets and information about the power of the beams corresponding to the users included in the target user sets.

The plurality of base stations receives the scheduling information from the result providing unit 330, and generates a transmission signal for the users included in the target user sets using the scheduling information.

Figure 4:
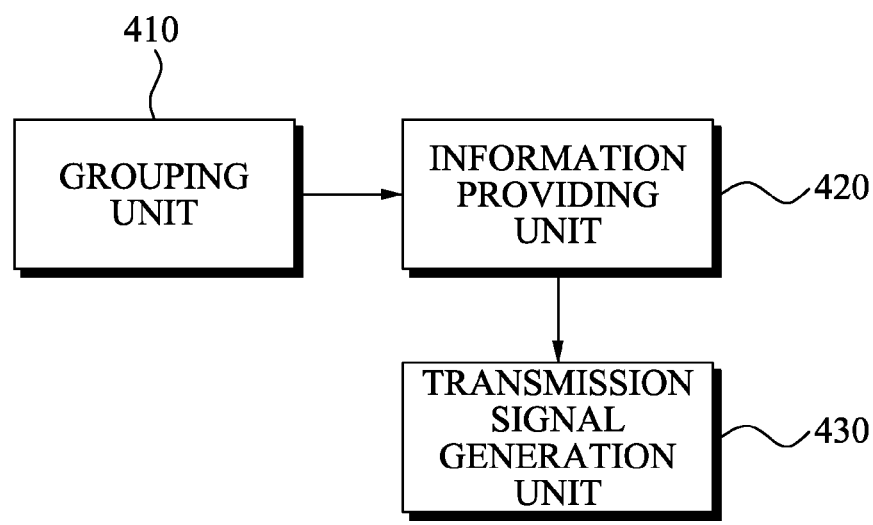
FIG. 4 is a block diagram illustrating a base station according to an exemplary embodiment.

FIG. 4 illustrates an exemplary base station.

As illustrated in FIG. 4, the base station includes a grouping unit 410, information providing unit 420, and transmission signal generation unit 430.

The grouping unit 410 performs a local optimization operation. That is, the grouping unit 410 groups a plurality of users into a plurality of candidate user sets based on a data transmission rate that a target base station may achieve. The plurality of users may be included in a coverage of the target base station.

The information providing unit 420 provides user set information about the plurality of candidate user sets to a communication system control apparatus. The user set information may include at least one of channel information, beamforming weight vector information, and interference information about users included in the candidate user sets.

The communication system control apparatus may calculate a sum data transmission rate that may be achieved by the target base station and at least one base station neighboring the target base station. Accordingly, the communication system control apparatus may select the target user set from the candidate user sets based on the sum data transmission rate, and perform scheduling with respect to users included in the target user set. The power of beams corresponding to the users included in the target user set may be determined as any one of turn-on mode and turn-off mode.

The transmission signal generation unit 430 generates a transmission signal corresponding to the users included in the target user set based on scheduling information of the communication system control apparatus. Further, the transmission signal generation unit 430 may generate the transmission signal based on the controlled power of the beams.

The operation of the exemplary base station has been described in association with the communication system control apparatus, an exemplary of which is described with reference to FIG. 3. Accordingly, a further description of the communication system control apparatus will be omitted herein.

Figure 5:
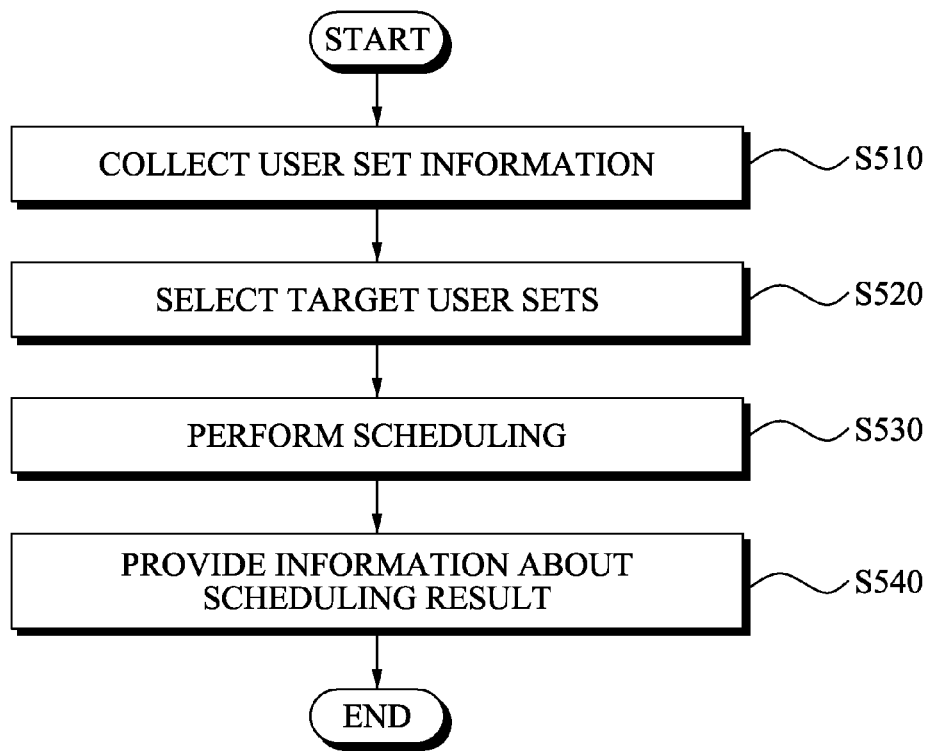
FIG. 5 is a flowchart illustrating a communication system control method according to an exemplary embodiment.

FIG. 5 illustrates an exemplary communication system control method.

With reference to FIG. 5, the method comprises collecting user set information about candidate user sets grouped by a plurality of base stations, in operation S510.

The method further comprises selecting target user sets corresponding to the plurality of base stations from among the candidate user sets based on an achievable sum data transmission rate of the plurality of base stations, in operation S520. The achievable sum data transmission rate may be calculated based on the user set information.

The method further comprises performing scheduling with respect to users included in the target user sets, in operation S530. In operation S530, the power of beams corresponding to the users included in the target user sets may be controlled based on the achievable sum data transmission rate.

The method further comprises providing information about the scheduling result to the plurality of base stations, in operation S540.

The systems, apparatus, and base station associated with the exemplary communication system control method have been described with reference to FIGS. 1 though 4. Accordingly, a further description thereof will be omitted herein.

The methods described above including a communication system control method may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims

What is claimed is:

1. A communication system control apparatus, comprising:
    an information collection unit configured to collect user set information of candidate user sets grouped by base stations, the user set information comprising a summation of interference among users included in the candidate user sets, interference between cells comprising the respective base stations and users, and noise; and
    a scheduler configured to select target user sets corresponding to the base stations from the candidate user sets based on an achievable sum data transmission rate of the base stations, and perform scheduling with respect to users included in the target user sets, the achievable sum data transmission rate being calculated based on the user set information.

2. The communication system control apparatus of claim 1, wherein the scheduler is configured to select the target user sets from the candidate user sets based on the interference between the cells.

3. The communication system control apparatus of claim 1, wherein the scheduler is configured to select the target user sets to maximize the achievable sum data transmission rate.

4. The communication system control apparatus of claim 3, wherein the scheduler is configured to control powers of beams corresponding to the users included in the target user sets based on the achievable sum data transmission rate.

5. The communication system control apparatus of claim 4, wherein the scheduler is configured to control powers of the beams corresponding to the users included in the target user sets to any one of a turn-on mode and a turn-off mode.

6. The communication system control apparatus of claim 1, wherein the user set information further includes at least one of channel information and beamforming weight vector information.

7. The communication system control apparatus of claim 1, wherein the base stations are configured to group the candidate user sets based on a data transmission rate achievable by each of the base stations.

8. The communication system control apparatus of claim 1, further comprising:
    a result providing unit configured to transmit information a scheduling result of the scheduler to the base stations.

9. The communication system control apparatus of claim 8, wherein each of the base stations is configured to generate a transmission signal corresponding to the users included in the target user sets based on the scheduling information.

10. The communication system control apparatus of claim 1, wherein each of the base stations comprises antennas.

11. A communication system control method, the method comprising:
    collecting user set information of candidate user sets grouped by base stations, the user set information comprising a summation of interference among users included in the candidate user sets, interference between cells comprising the respective base stations and users, and noise;

selecting target user sets corresponding to the base stations from the candidate user sets based on an achievable sum data transmission rate of the base stations, the achievable sum data transmission rate being calculated based on the user set information;

performing scheduling with respect to users included in the target user sets; and providing information of a result of the scheduling to the base stations.

12. The communication system control method of claim 11, wherein the selecting of the target user sets comprises selecting the target user sets from the candidate user sets, based on the interference between the cells.

13. The communication system control method of claim 11, further comprising controlling powers of beams corresponding to the users included in the target user sets based on the achievable sum data transmission rate.

14. The communication system control method of claim 13, wherein the controlling of the powers comprises controlling the powers of the beams corresponding to the users included in the target user sets to any one of a turn-on mode and a turn-off mode.

15. A base station, comprising:
a grouping unit configured to group users into candidate user sets based on an achievable data transmission rate of the base station;
an information providing unit configured to provide user set information of the candidate user sets to a communication system control apparatus, the user set information comprising a summation of interference among users included in the candidate user sets, interference between cells comprising respective base stations and users, and noise; and
a transmission signal generation unit configured to generate a transmission signal corresponding to a user included in a target user set based on a scheduling result of the communication system control apparatus, the target user set being selected by the communication system control apparatus from the candidate user sets.

16. The base station of claim 15, wherein the base station is configured to control powers of beams corresponding to the at least one user included in the target user set to any one of a turn-on mode and a turn-off mode, and the transmission signal generation unit is configured to generate the transmission signal corresponding to the at least one user included in the target user set based on the controlled powers.

17. The base station of claim 15, wherein the target user set is selected by the communication system control apparatus from the candidate user sets based on a sum data transmission rate achievable by the base station and at least one base station neighboring to the base station, and the scheduling result is a result of performing scheduling with respect to the at least one user included in the target user set by the communication system control apparatus.

18. A non-transitory computer-readable recording medium storing a program for implementing a communication system control method, the program comprising instructions to cause a computer to:
collect user set information of candidate user sets grouped by base stations, the user set information comprising a summation of interference among users included in the candidate user sets, interference between cells comprising the respective base stations and users, and noise;
select target user sets corresponding to the base stations from among the candidate user sets based on an achievable sum data transmission rate of the base stations;
perform scheduling with respect to users included in the target user sets, the achievable sum data transmission rate being calculated based on the user set information; and
provide information about a result of the scheduling to the base stations.

19. The communication system control apparatus of claim 1, wherein the interference information is based on a ratio of a maximum transmission power used by the base stations and a maximum number of elements in the candidate user sets.

20. The communication system control apparatus of claim 6, wherein the interference information is based on a product of the channel information, the beamforming weight vector information, and a maximum transmission power used by the base stations.

* * * * *